(12) United States Patent
Srivastava et al.

(10) Patent No.: US 11,232,060 B2
(45) Date of Patent: Jan. 25, 2022

(54) METHOD, APPARATUS AND SYSTEM FOR POWER SUPPLY POLICY EXCHANGE ON A BUS

(71) Applicant: Intel Corporation, Santa Clara, CA (US)

(72) Inventors: Amit Kumar Srivastava, Folsom, CA (US); Kenneth P. Foust, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 956 days.

(21) Appl. No.: 15/706,902

(22) Filed: Sep. 18, 2017

(65) Prior Publication Data

US 2019/0087378 A1 Mar. 21, 2019

(51) Int. Cl.
*G06F 13/00* (2006.01)
*G06F 13/42* (2006.01)
*G06F 1/26* (2006.01)
*G06F 13/38* (2006.01)

(52) U.S. Cl.
CPC ............ *G06F 13/4282* (2013.01); *G06F 1/26* (2013.01); *G06F 13/385* (2013.01)

(58) Field of Classification Search
CPC ........ G06F 13/00; G06F 13/4282; G06F 1/26; G06F 13/385
See application file for complete search history.

(56) References Cited

U.S. PATENT DOCUMENTS

| | | | |
|---|---|---|---|
| 2009/0157929 A1* | 6/2009 | Pigott | G06F 13/4291 710/110 |
| 2010/0169523 A1 | 7/2010 | Dunstan et al. | |
| 2013/0335151 A1 | 12/2013 | Schrom et al. | |
| 2014/0016679 A1 | 1/2014 | Kesling et al. | |
| 2014/0229644 A1 | 8/2014 | Thanigasalam et al. | |
| 2016/0188245 A1* | 6/2016 | Thadi Suryaprakash | G06F 1/3287 710/13 |
| 2017/0315747 A1* | 11/2017 | Yang | G11C 11/4074 |

OTHER PUBLICATIONS

U.S. Appl. No. 15/237,928, filed Aug. 16, 2016, entitled "Method, Apparatus and System for Role Transfer Functionality for a Bus Master," by Amit Kumar Srivastava, et al.

(Continued)

*Primary Examiner* — Tim T Vo
*Assistant Examiner* — Kim T Huynh
(74) *Attorney, Agent, or Firm* — Trop, Pruner & Hu, P.C.

(57) ABSTRACT

In one embodiment, an apparatus includes an input/output (I/O) circuit to communicate information at a selected voltage via an interconnect to which a plurality of devices may be coupled, and a host controller to couple to the interconnect. The host controller may include a supply voltage policy control circuit to initiate a supply voltage policy exchange with a first device to obtain a first supply voltage capability of the first device and to cause the I/O circuit and the first device to be configured to communicate via the interconnect at a first supply voltage based on the first supply voltage capability. Other embodiments are described and claimed.

20 Claims, 11 Drawing Sheets

(56) References Cited

OTHER PUBLICATIONS

U.S. Appl. No. 15/366,001, filed Dec. 1, 2016, entitled "Method, Apparatus and System for Dynamic Clock Frequency Control on a Bus," by Duane G. Quiet, et al.
U.S. Appl. No. 15/198,027, filed Jun. 30, 2016, entitled "Method, Apparatus and System for Dynamic Optimization of Signal Integrity on a Bus," by Duane G. Quiet.
MIPI Alliance, "Specification Brief, Audio & Control: SLIMbus®, SoundWireSM," Oct. 7, 2014, 1 page.
U.S. Appl. No. 15/627,735, filed Jun. 20, 2017, entitled "System, Apparatus and Method for Extended Communication Modes for a Multi-Drop Interconnect," by Amit Kumar Srivastava.
U.S. Appl. No. 15/627,749, filed Jun. 20, 2017, entitled "System, Apparatus and Method for Tunneling and/or Multiplexing via a Multi-Drop Interconnect," by Amit Kumar Srivastava.
U.S. Appl. No. 15/635,299, filed Jun. 28, 2017, entitled "Method, Apparatus and System for Dynamic Control of Clock Signaling on a Bus," by Kenneth P. Foust, et al.

\* cited by examiner

METHOD, APPARATUS AND SYSTEM FOR POWER SUPPLY POLICY EXCHANGE ON A BUS

TECHNICAL FIELD

Embodiments relate to communication of information on bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the Mobile Industry Processor Interface (MIPI) Alliance™ (www.mipi.org). This interface is expected to be used to connect devices, such as internal or external sensors or so forth, to a host processor, applications processor or standalone device via a host controller or input/output controller. This multi-drop bus provides for single-ended bi-directional data communication with a single-ended clock signal. However difficulties may occur when multiple devices that connect to the bus operate at different supply voltages.

DETAILED DESCRIPTION

Figure 1:
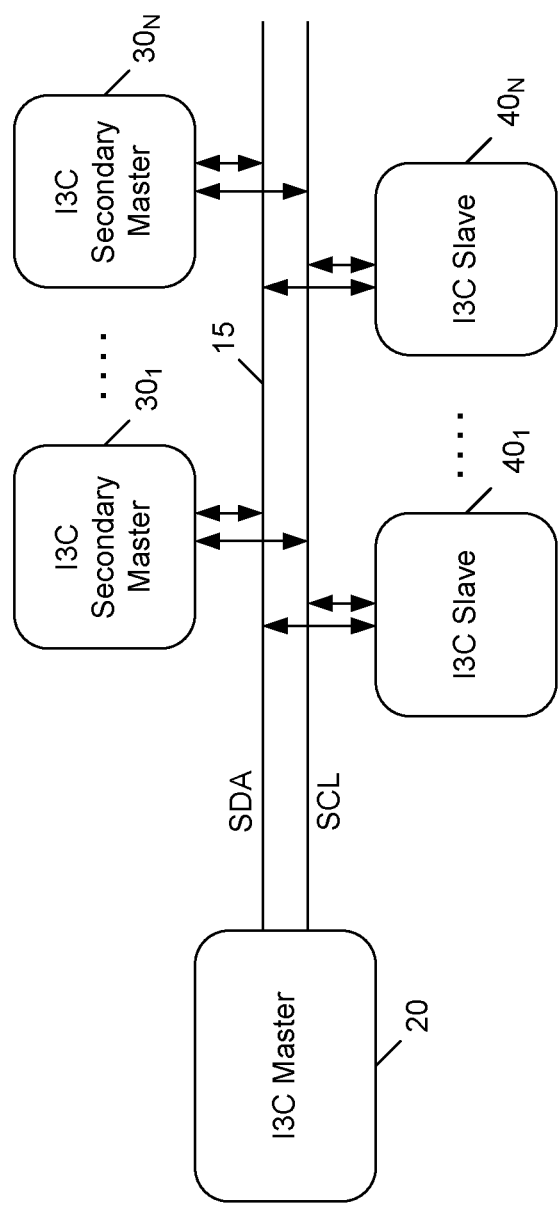
FIG. 1 is a block diagram of a system in accordance with an embodiment of the present invention.

In various embodiments, multiple devices, some of which may operate at one or more different supply voltage levels, may couple to a common interconnect such as a multi-drop bus. More specifically, in embodiments a host controller coupled to the bus may dynamically determine supply voltage capabilities of the different devices via a voltage policy exchange technique. Thereafter, when communication is to occur with a given one of these devices, a dynamic re-configuration of communication circuitry such as internal communication circuitry of the host controller (and/or a device that includes this host controller) and a communicating device (e.g., one of multiple slave devices coupled to the bus) may occur. In this way, the bus may be dynamically controlled to operate at different supply voltages (in which communication of signals may occur at different swing levels depending upon a particular device with which the host controller is communicating). Furthermore, embodiments provide control techniques, including broadcast messages, to inform the devices regarding upcoming supply voltage changes for the bus.

With a system configuration as described herein, multiple devices that operate according to different supply voltages may couple to a single multi-drop bus, reducing the number of pins to enable communication with multiple devices. For example, in an embodiment in which three slave devices couple to a main or master device (such as a processor or other system on chip (SoC)), a reduction in pin count of 2N may occur (where N is the number of coupled devices). Furthermore, by way of this arrangement, reduced chip real estate and reductions in routing of signals on, e.g., a motherboard, to enable coupling of multiple devices via this multi-drop bus is realized.

As will be described herein, supply voltage policies may be exchanged between a master device and various slave devices via this multi-drop bus. In response to such exchanges, input/output (I/O) supply voltages may dynamically change prior to bus operation with a given one or more such devices. To this end a platform power manager enables a supply voltage to be enabled and later both a master device and a slave device may configure their internal circuitry to operate at a given supply voltage to enable bus communication at this supply voltage, while avoiding any reverse current from high voltage to low voltage or protection from high voltage issues.

Note that the supply voltage policy exchanges described herein also may be used to enable certain devices (e.g., given slave devices) to enter into low power states and exit from such states. Furthermore, to enable efficient realization of the dynamic supply voltages, supply voltage configuration information obtained during an initial discovery process may be stored in a configuration storage of the host controller. In this way, as devices exit a low power mode and begin a communication, the host controller can dynamically control communication to proceed at a given supply voltage, without the need for an additional discovery process to ascertain the supply voltage capabilities of such device. As such, supply voltage information obtained via a supply voltage policy exchange (and corresponding dynamic address information) may be stored in particular locations within the devices that remain always powered on even in low power modes so that this information is accessible upon low power state exit.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15. In embodiments herein, bus 15 may be implemented as an I3C bus in accordance with the I3C Specification. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware circuitry to act as a bus master for bus 15. Master device 20 may include a controller (not shown in the high level view of FIG. 1) to control data (SDA) and clock (SCL) lines, as well as use (e.g.) internal current sources or passive pullups to hold bus 15 when all coupled devices are powered off. In some cases, master device 20 may be a relatively simple host controller for a low complexity bus or other multi-drop bus, such as in accordance with an I²C or I3C Specification. Other multi-drop interfaces such as Serial Peripheral Interface and/or Microwire also may be present in a particular embodiment.

In different implementations, master device 20 may be an interface circuit of a multicore processor or other system on chip (SoC), application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as dedicated hardware circuit, e.g., a programmable logic, to perform bus master activities for bus 15.

Note that bus 15 is implemented as a two-wire bus in which a single serial line forms a data interconnect and another single serial line forms a clock interconnect. As such, data communications can occur, e.g., in bi-directional manner and clock communication can occur in a single direction (with potentially different originators as described herein). Master device 20 may be a relatively complex compute device (as compared to other devices on bus 15) that consumes higher power than other devices coupled to bus 15.

As shown in FIG. 1, multiple secondary master devices $30_1$-$30_N$ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20, known as a secondary master). One or more such secondary master devices 30 may be controlled to act as bus master for bus 15 while main master device 20 is in a low power state, to enable bus operations to continue to proceed while in this low power state. In embodiments, one or more of secondary master devices 30 may include clock generation circuitry such that these devices may control and direct a clock signal onto the clock interconnect of bus 15 to communicate information in an optimized manner.

As further illustrated in FIG. 1, a plurality of slave devices $40_1$-$40_N$ also couple to bus 15. In different embodiments, slave devices 40 (generically) may take many different forms. For purposes of discussion herein, it may be assumed that slave devices 40 may be always on (AON) devices, such as sensors like micro-electrical mechanical systems (MEMS), imaging sensors, peer-to-peer devices, debug devices or so forth. As examples, one or more slave devices 40 may be a given type of sensor, such as an accelerometer or other sensor which may be incorporated in a given system (such as a smartphone or other mobile platform).

In embodiments, one or more of slave devices 40 may be configured to operate at different supply voltages (potentially from each other, as well as potentially with respect to master 20 and/or secondary master devices 30). As examples, some slave devices 40 may be configured to operate at lower supply voltages than the other devices coupled to bus 15 and it is also possible for one or more slave devices 40 to operate at higher supply voltages. Note further that one or more slave devices 40 may provide for operation at multiple supported supply voltages. Furthermore as slave devices 40 may be dynamically controlled to be placed into low power states when inactive, a given slave device 40 may operate at multiple supply voltages, including one or more supply voltages for normal operation and one or more supply voltages for lower power operation. Still further as will be described herein, in embodiments slave devices 40 also may be configured to operate at a configuration supply voltage. This configuration supply voltage, which may be a default supply voltage at which initial bus communications on bus 15 may occur, enables a power supply policy exchange to occur for a given slave device 40 to be configured for operation at a given supply voltage (and to thereafter communicate along bus 15 at this given supply voltage).

For purposes of discussion herein, assume devices 30, 40 operate as slaves to master device 20. One or more devices 30, 40 may be powered when they are to be active, such as a type of sensor, e.g., a camera device that is powered on only when a camera functionality of the system is active. Other devices 30, 40 may be powered when coupled to bus 15. In one case, a device may be a slave device that can be physically added/removed via a hot plug or hot unplug operation, such as a cable, card or external peripheral device that is coupled to bus 15, e.g., by a cable, external connection or so forth. Understand while shown at this high level in the embodiment of FIG. 1, many variations and alternatives are possible.

Figure 2:
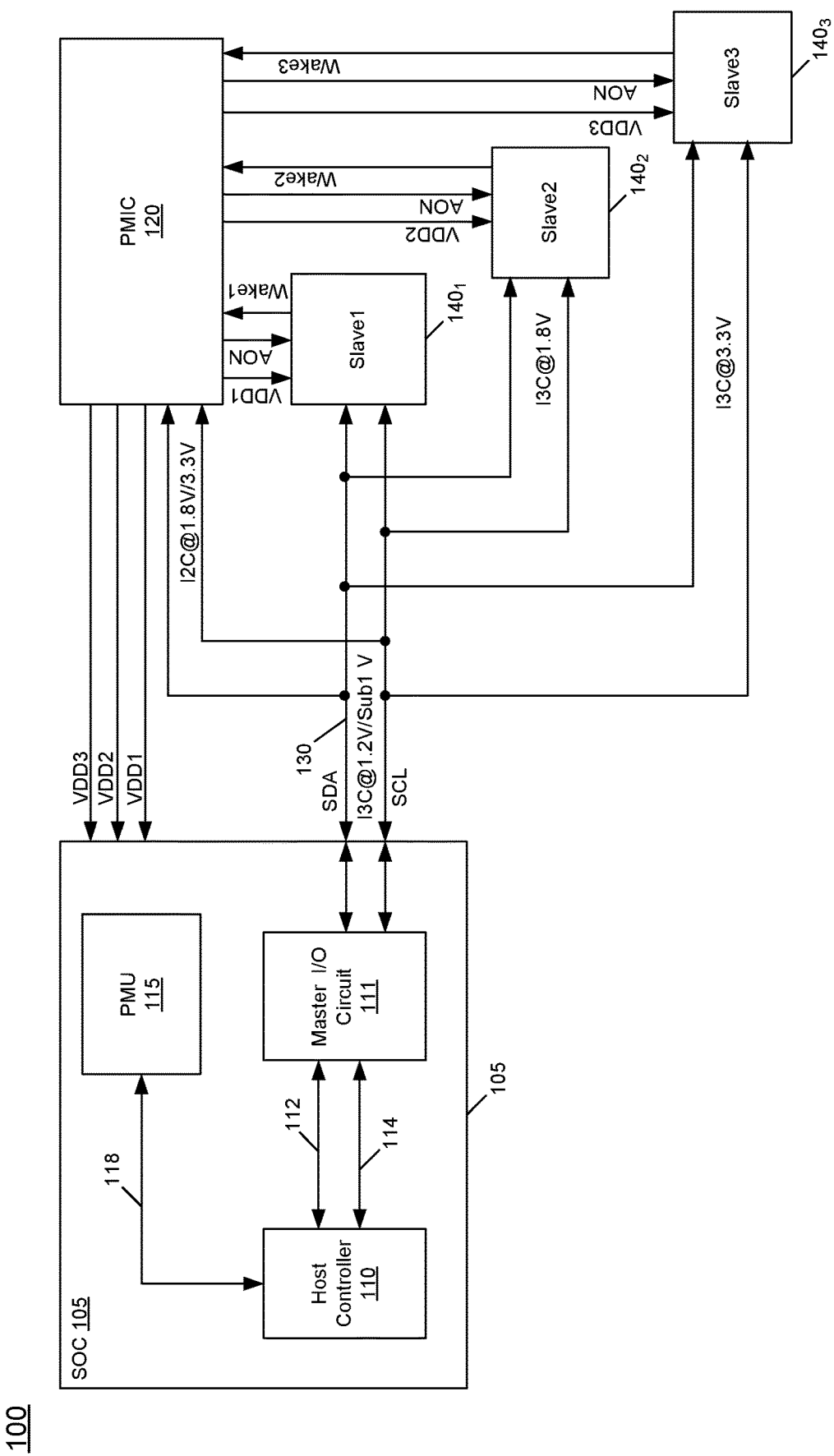
FIG. 2 is a block diagram of a system in accordance with another embodiment of the present invention.

Referring now to FIG. 2, shown is a block diagram of another system in accordance with an embodiment of the present invention. As shown in FIG. 2, a portion of a system 100 includes a main master 105 which in the embodiment shown is a system on chip (SoC) including a host controller 110 coupled to a plurality of devices $140_1$-$140_3$ via a multi-drop bus 130. As further illustrated, main master 105 includes a master input/output (I/O) circuit 111 and a power management unit (PMU) 115. Devices 140 (also referred to herein as "slaves") may have different operational characteristics and also may have different capabilities of being added/removed from bus 130. As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in bi-directional manner and clock communications can occur in a unidirectional manner.

Host controller 110 may include or be coupled to a processing circuit. Understand that many different types of host controllers can be provided. As examples, host controller 110 may be an interface circuit of a multicore processor or other SoC, application processor or so forth. In other cases, host controller 110 may be a standalone host controller for bus 130. And of course other implementations are possible. In different implementations, the processing circuit within (or coupled to) host controller 110 may represent one or more cores or other hardware processing logic of a particular device or it may simply be part of an interface circuit to act as transmitter and receiver for host controller 110.

Still referring to FIG. 2, host controller 110 couples to master I/O circuit 111 via a first interface 112 and a second interface 114. First interface 112 is a controller-I/O interface via which various types of communications may occur. In turn, second interface 114 is a power configuration interface (which in an embodiment may be a four-bit wide interface) to enable communication of power configuration information as described herein.

Host controller 110 further communicates with PMU 115. In embodiments, PMU 115 is a primary power controller for main master 105 and may take different forms in different implementations. For example, in some cases PMU 115 may be a dedicated microcontroller or other control circuitry. In yet other cases, PMU 115 may be implemented at least in part as a part of another hardware circuit of main master 105 (such as a given core or other processing engine) on which firmware, software and/or combinations thereof may execute. In any event, PMU 115 may perform internal power management operations, including dynamically configuring master I/O circuit 111 for operation at a given supply voltage, e.g., based at least in part on a particular slave device 140 with which main master 105 is to communicate. To enable the dynamic supply voltage configuration and dynamic supply voltage control operation, PMU 115 couples to host controller 110 via an interface 118, namely a controller-PMU interface.

In identifying available and appropriate supply voltages, PMU 115 may be further in communication with a power management integrated circuit (PMIC) 120, which in an embodiment may be a primary power management component of system 100. PMIC 120 is configured to provide various supply voltages to the different components of system 100. For example purposes, assume system 100 is capable of operation at three different supply voltages (namely VDD1-VDD3). As seen, PMIC 120 provides these multiple supply voltages to main master 105 and further provides at least a respective one of the supply voltages to each of slaves $140_1$-$140_3$. Note that communication between PMU 115 and PMIC 120 may occur via interface 118, through host controller 110, through one or more of interfaces 112, 114 and through I/O circuit 111 to enable communication of these messages via bus 130 to PMIC 120.

Note that PMIC 120 may further provide one or more low power supply voltages (namely an AON voltage) to each of slave devices 140, to enable a given slave device 140 to identify a condition (such as a sensing opportunity) for which the device is to exit the low power state. As such, using this AON supply voltage, a given slave device 140 may issue a wake signal (namely Wake1-Wake3) to PMIC 120 to identify such low power state exit requests and to trigger a low power state exit flow to cause an operating supply voltage to be provided to given slave device 140 to enable its normal operation.

Still further with reference to FIG. 2, note that bus 130 is configured such that, depending upon given control, communication may occur at one of multiple different supply voltages. In the example shown, communication between main master 105 and slave device $140_1$ may be at a relatively low supply voltage level, e.g., 1.2 volts (V) or even a sub-1.0 V supply voltage level. In turn, communication between main master 105 and slave device $140_2$ may be at a voltage level of 1.8V, which in an embodiment may be a default supply voltage configuration level at which all devices may communicate, such as for performing at least a power supply policy exchange communication as described herein. As further shown, main master 105 may communicate with slave device $140_3$ at a relatively high voltage, e.g., at a 3.3 volt level. As further shown, communications between main master 105 and PMIC 120 may be at a default voltage level and/or a higher voltage level (e.g., 3.3V). Understand while shown with these particular voltage levels for illustrative purposes, the scope of the present invention is not limited in this regard and in other embodiments communication may be at other supply voltage levels.

In embodiments, a master device (such as main master 105) may initiate a power supply policy exchange while a bus is in a default configuration mode (e.g., 1.8V). During such exchange, the main master may begin dynamic address assignment with available slaves and record slave capabilities and dynamic addresses in a given configuration storage (such as one or more bus characteristic registers). Thereafter, a power supply exchange flow may proceed to dynamically control bus operation to be at a given supply voltage for a particular slave device with which the main master is to communicate. To this end, in embodiments a host controller may issue a broadcast supply voltage configuration message to all slave devices to enable their configuration (as well as to internally control configuration of the master device, e.g., by way of an internal power manager).

Thereafter, the host controller may determine that the given device(s) are operating at the appropriate supply voltage. Such determination may be based, in an embodiment, via communication with a main power manager of a system such as a PMIC. The PMIC may provide status information as to provision of the requested supply voltages to the slave device(s). When it is determined that such supply voltage has been provided, the master may communicate with a direct command to the appropriate device(s), based on address matching within such devices. After such communication and it is determined that there is no further communication or the bus is idle, a broadcast supply exit message may be communicated by the master device to indicate a reversion of the supply voltage for the bus to the default supply voltage, to which the one or more slave devices also may return. Note of course that additional policies may be present in other embodiments.

Figure 3:
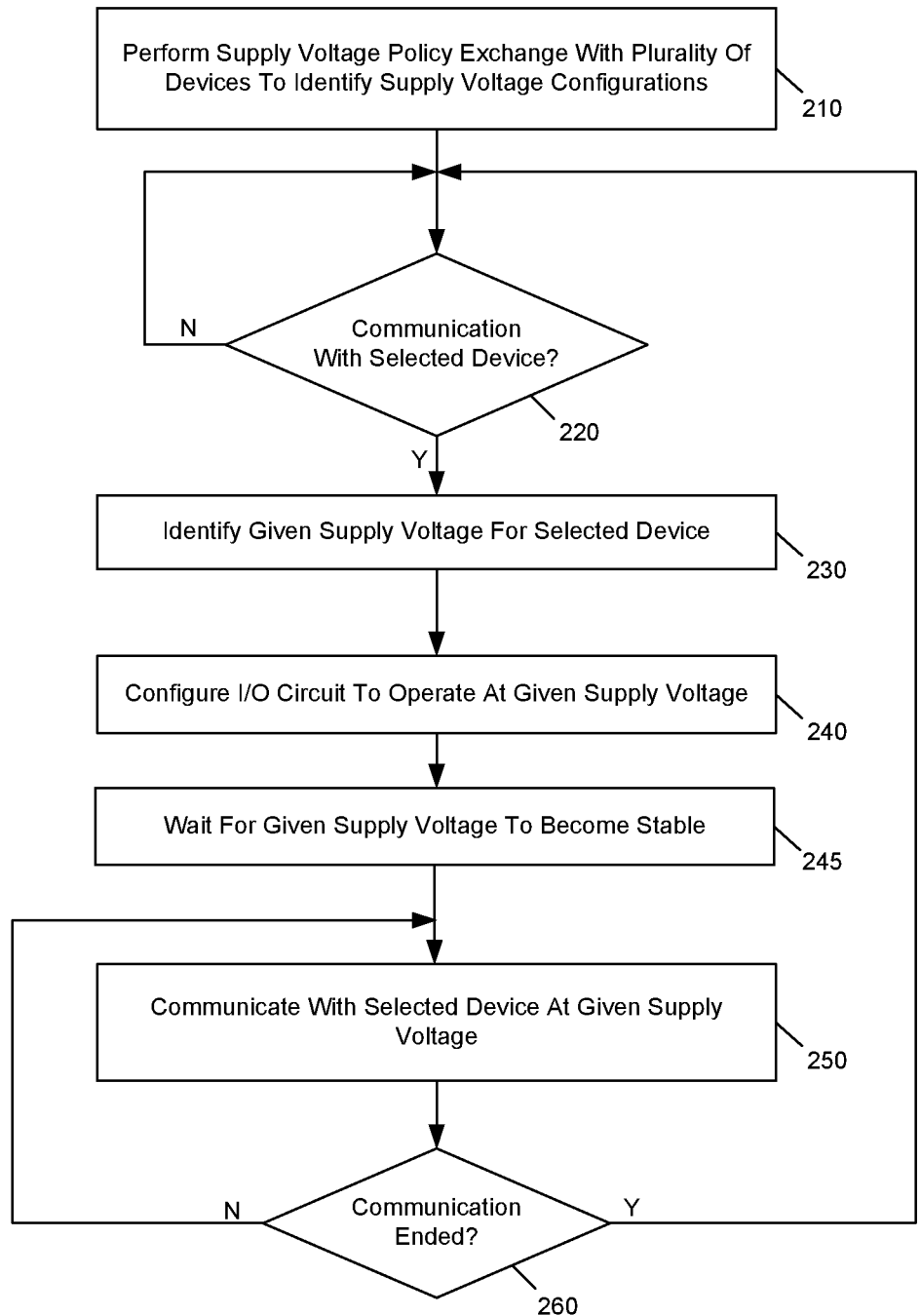
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 is a method for performing communications via a multi-drop bus as described herein. More specifically, method 200 may be used to communicate with a given device at a supply voltage that differs from a default supply voltage. In embodiments, method 200 may be performed by a host controller, in conjunction with one or more other entities, including a PMU of an SoC, a PMIC, and a device with which the host controller is to communicate.

As illustrated, method 200 begins by performing a supply voltage policy exchange with multiple devices to identify supply voltage configurations (block 210). Note that this exchange process may be performed upon initialization of a system, when a new device is inserted to a system, or at other times. As such, embodiments may perform this power supply policy exchange process to enable the host controller (and connected devices) to identify appropriate supply voltages for the devices and maintain such information in one or more configuration storages such that this information can be accessed during bus communications. Details of an exchange are described below.

As such, the remainder of method 200 may be performed for a given bus communication. As seen, control next passes to diamond 220 to determine whether communication is to occur with a selected device. As an example, the host controller may receive a request, e.g., from an applications processor to communicate with a particular device. Control next passes to block 230 where a given supply voltage is identified for this selected device. As an example, the host controller may access a configuration storage to identify this supply voltage (wherein this information may originally be received from the device itself during a configuration process).

Still with reference to FIG. 3, control next passes to block 240 where an I/O circuit (e.g., of the SoC) can be configured to operate at this given supply voltage. It is assumed that the device itself may already be configured for operation at that voltage. However, in certain instances where a device may operate at multiple supply voltages, a similar process to configure an I/O circuit of that device to operate at this given supply voltage also may be performed. Then at block 245, operation waits until the supply voltage become stable.

In any event, control next passes to block 250 where communication with the selected device may occur via the multi-drop bus at the given supply voltage. Such communications may occur bi-directionally. Furthermore, in implementations the host controller, by way of the I/O circuit, may also provide a clock signal to the device, which it may use for communication activities, as well as potentially for its internal operations (in instances where such device is a low power or low complexity device that does not include an internal clock generator).

Control next passes to diamond 260 to determine whether the communication has ended. If so, control passes back to diamond 220 to wait for an opportunity for communication with this or another device. Otherwise, continued communications between the host controller and the device may proceed, with control passing back to block 250. Understand while shown at this high level in the embodiment of FIG. 3, many variations and alternatives are possible.

Figure 4:
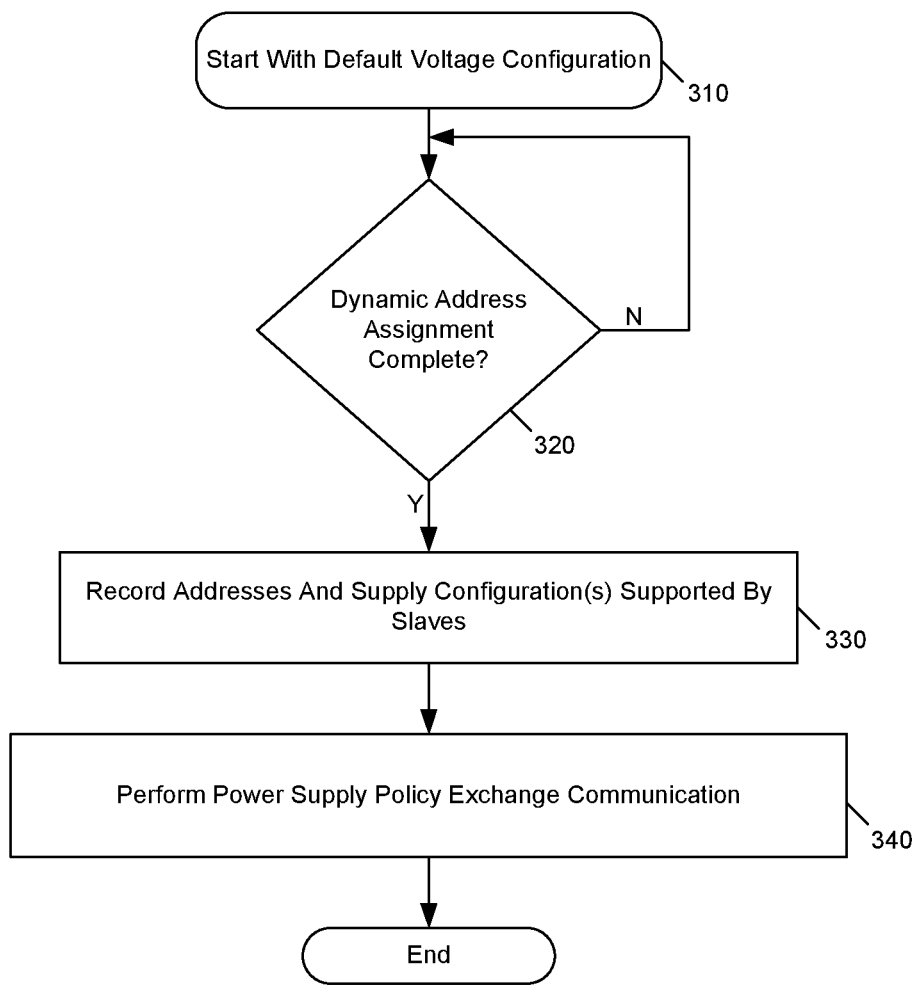
FIG. 4 is a flow diagram of a method in accordance with an embodiment of the present invention.

Referring now to FIG. 4, shown is a flow diagram of a method in accordance with an embodiment of the present invention. More specifically, method 300 of FIG. 4 shows a high level flow for communication of power supply policy exchanges over a multi-drop bus as described herein. In an embodiment, method 300 may be initiated by a master device, such as a main master device including a host controller including hardware circuitry, firmware, software and/or combinations thereof to perform various bus control activities, including the exchange of power supply policy information as described herein.

As seen, this communication cycle begins at a default voltage configuration (block 310). As a representative example, assume that the multi-drop bus is configured for operation at a default voltage of 1.8V. During this communication process, it is determined at diamond 320 whether a dynamic address assignment is completed. For example, such dynamic address assignment may occur when a given device is introduced into a system, e.g., via a power on/reset situation and/or a hot plug of the device into the system.

Understand that in different embodiments, various techniques for performing this dynamic address assignment may occur.

When a dynamic address assignment is completed such that a slave device is provided with a given address, control passes to block 330 where the master may record this dynamic address for the slave device. Furthermore, the master may store configuration information, including one or more supply voltages that are supported by this slave device. In an example, the slave may communicate this supply configuration information by way of information present in one or more configuration registers of the slave device. In an embodiment, this supply configuration information includes information used bring up the system, address information, number of devices connected, and system policies to enable, as examples. Thereafter, a power supply policy exchange communication may be performed (block 340), further details of which are described below. At this point, the given device (and master) are configured for operation at a particular supply voltage. Understand while shown at this high level in the embodiment of FIG. 4, many variations and alternatives are possible.

In other embodiments, a slave may initiate a supply voltage policy exchange communication. To this end, a slave may be in a given state (e.g., connected via a hot join indication such as an in-band interrupt (IBI) with a given address). Then the slave device may indicate its supply voltage capability via communication of configuration information and its assigned address. Referring now to Table 1, shown is an example packet format for use in a policy exchange according to an embodiment of the present invention. In the embodiment shown in Table 1, this hand-off may include the slave device communicating information including its supply voltage capability. Thereafter, the master device acknowledges this message, and a push-pull operation occurs such that the slave communicates a byte of information. After that communication, a T-bit is driven high or low and then the data line is placed into a high impedance state (High-Z). Thereafter push-pull operation occurs again.

TABLE 1

| Open Drain | Open Drain | Open Drain | Hand Off | Push-Pull | Drive High or Low, and then High-Z | Push-Pull |
|---|---|---|---|---|---|---|
| S | Slave-addr-as-IBI/R Include Supply Capability in BCR registers | | Master_ACK | SCL High | Slave_byte | T | Sr |

Assuming that the master device acknowledges this policy exchange initiated by the slave, communication may proceed at a given updated supply voltage. Otherwise, communication is at the default supply voltage.

Figure 5:
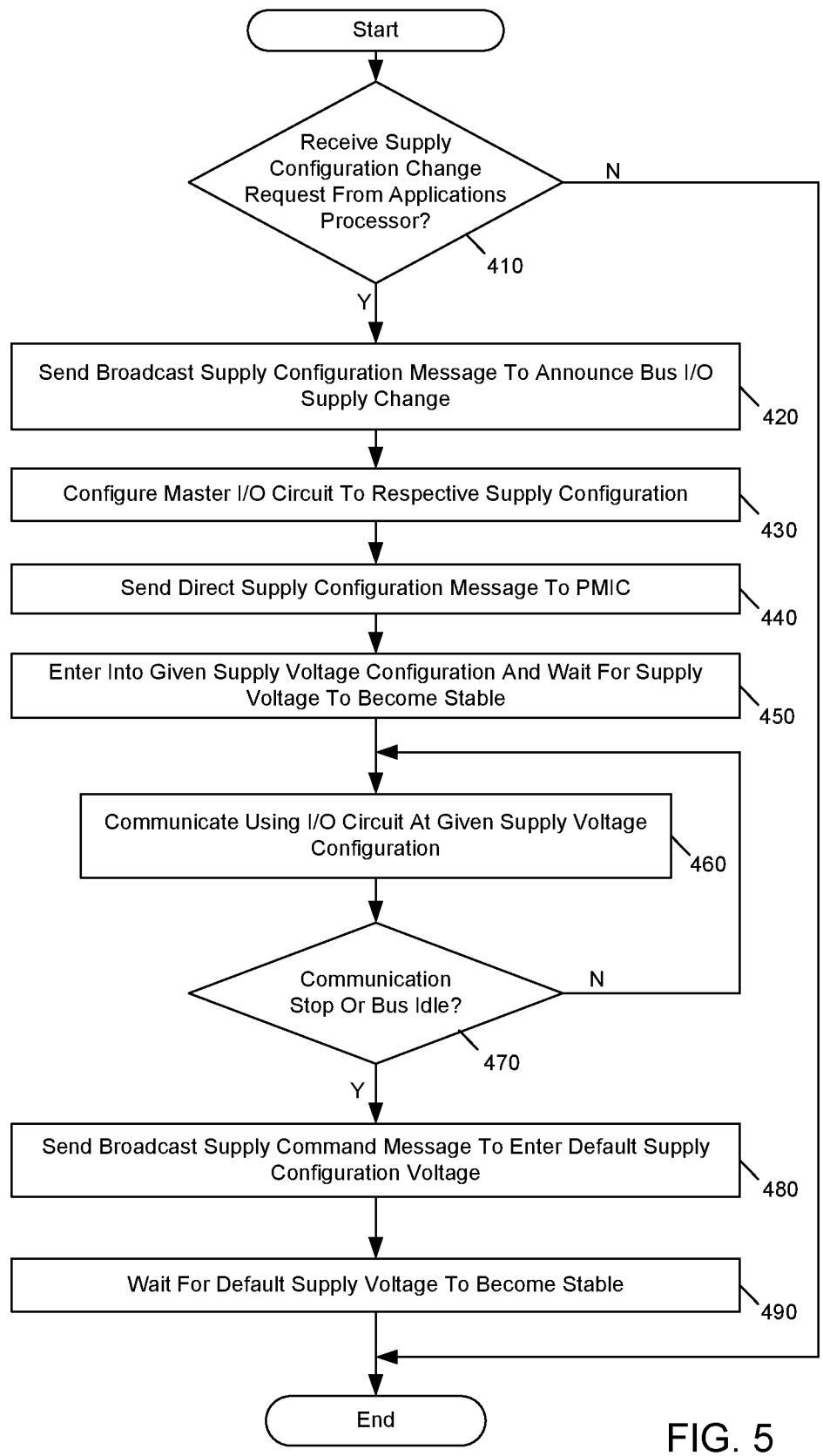
FIG. 5 is a flow diagram of a method in accordance with another embodiment of the present invention.

Referring now to FIG. 5, shown is a flow diagram of a method in accordance with another embodiment of the present invention. More specifically, method 400 is a method for performing a power supply policy exchange communication in accordance with an embodiment. In the embodiment shown in FIG. 5, method 400 is seen from the view of a host controller, which as described above may include hardware circuitry, software, firmware and/or combinations thereof. This power supply policy exchange communication begins by determining whether a supply configuration change has been received (diamond 410). In an embodiment, this change request may be received from a given manager such as an applications processor. If such supply configuration change has been received, control passes from diamond 410 to block 420. At block 420, the master device may send a broadcast supply configuration message. This configuration message thus announces a bus I/O supply change is upcoming. Depending upon the given requested supply configuration change, this supply voltage change may be to either a higher or lower voltage (than a default (or current)) supply voltage for the multi-drop bus.

Next control passes to block 430 where a power controller (e.g., the PMU) may configure the master I/O circuit to the respective supply configuration. In an embodiment, this configuration process may occur via communication through the host controller, as discussed above with regard to FIG. 2. Next control passes to block 440 where a direct supply configuration message is sent to the PMIC. By way of this communication a determination may be made whether the respective supply voltage is available. To this end, the PMIC may send an acknowledgement or other indication to indicate the availability of this supply voltage. If, for some reason it is determined that this supply voltage is not available, the system or device waits until the supply voltage becomes available.

Assuming that the desired supply voltage is available, control passes to block 450 where operation at the given supply voltage configuration may be entered. As examples, this supply voltage may be a sub-1.0 V, 1.2V, 3.3V, or another such voltage. To this end, at least the master IO circuit of the host controller and the communicating device are configured to operate at this supply voltage level. After waiting for this supply voltage to become stable, at block 460 communication may occur with the given device at this supply voltage. And with this dynamic supply voltage, note also that the bus swing level of bus communications changes to the configured supply voltage level. Next it is determined whether communication with this particular device has stopped or the bus is idle (diamond 470). If not, further communications occur (again to block 460). Otherwise, control passes to block 480 where the master may send a broadcast message. This broadcast message is a supply command message to all devices to cause the devices to enter into the default voltage for the multi-drop bus (e.g., at 1.8V). At block 490, the devices may wait for the supply voltage to stabilize before further burst communications occur. Note however that only communicating devices may change their I/O voltage level. Non-communicating devices only listen to the bus and wait for the bus to become idle so that they start initiating a transaction with same I/O voltage or after a change to the I/O voltage. Understand while shown at this high level in the embodiment of FIG. 5, many variations and alternatives are possible.

Figure 6:
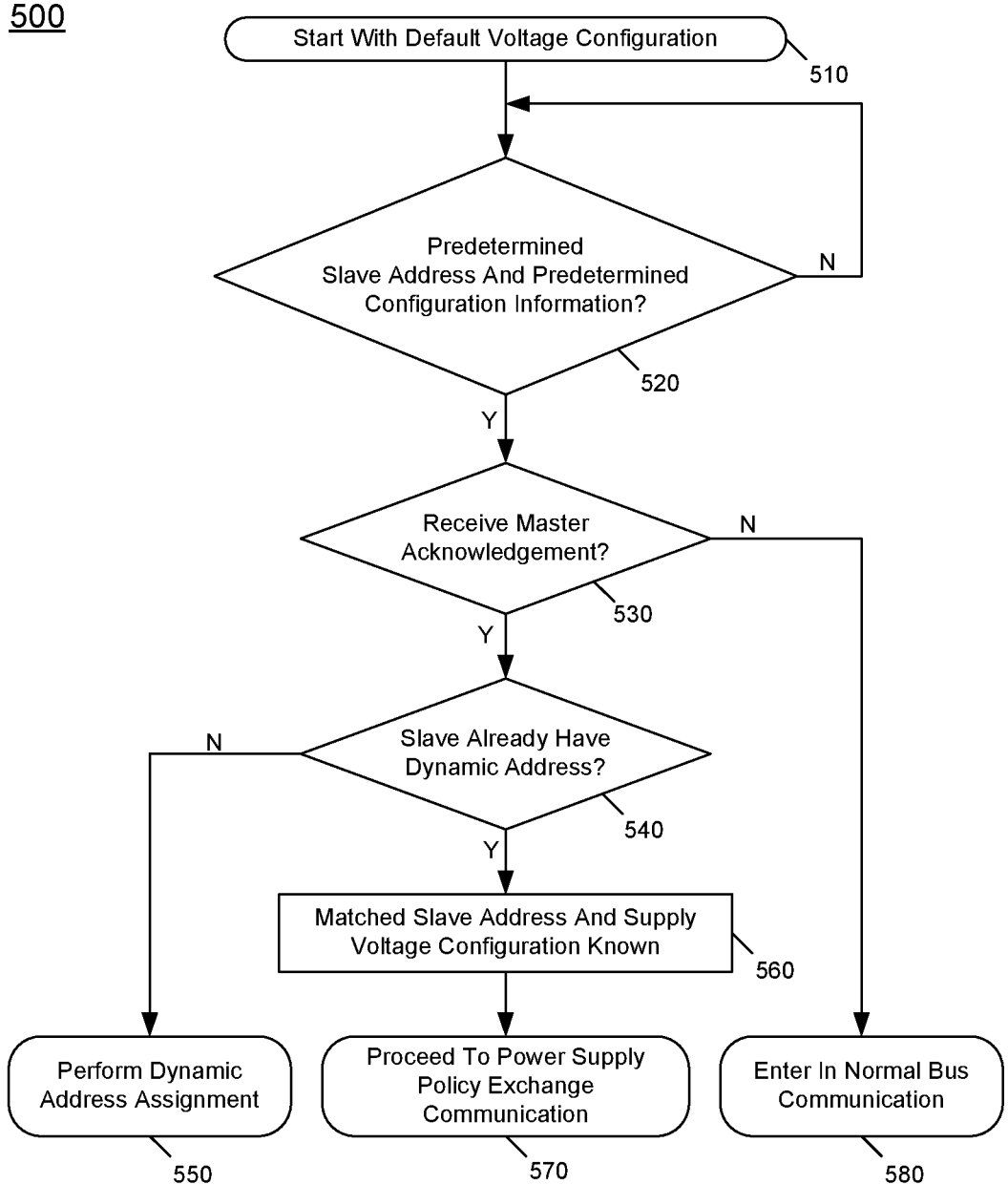
FIG. 6 is a flow diagram of a method in accordance with another embodiment of the present invention.

Referring now to FIG. 6, shown is a flow diagram of a method in accordance with another embodiment of the present invention. More specifically, method 500 of FIG. 6 is a method for performing a power policy exchange flow that is requested by a slave device. As such, method 500 is from the view of a controller of a slave device such as a given hardware control circuit which may include hardware circuitry, firmware, software and/or combinations thereof. As seen, method 500 proceeds in an environment in which the multi-drop bus is at a default voltage configuration (block 510). Next it is determined at diamond 520 whether predetermined address and configuration information are at a predetermined value. For example, this predetermined information may correspond to a predetermined slave address to identify hot join information and particular values within a configuration register. If this predetermined configuration information is of this value, control passes to diamond 530 to determine whether an acknowledgement has been received from the master device. If so, control passes to diamond 540 to determine whether the slave device already has a dynamic address. If not, control passes to block 550 where a dynamic address assignment process may be performed. More specifically here, control may pass to the master-initiated flow of FIG. 4 (and more specifically to block 330).

Still with reference to FIG. 6, otherwise if it is determined that the slave already has a dynamic address, control passes to block 560 to confirm that the slave address matches the known address and a supply voltage configuration is known, such as present in a configuration storage of the master device. If so, control passes to block 570 where a power supply policy exchange communication may occur (as in method 400 of FIG. 5), so that communication can occur in response to this slave-initiated voltage change process. Otherwise if no acknowledgement is received from the master, control passes to block 580 where normal data communication may occur (namely at a default supply voltage). Understand while shown at this high level in the embodiment of FIG. 6, many variations and alternatives are possible.

As described above, in embodiments slave devices (and master/secondary master devices as well) may enter into low power states when their activity is below a given threshold level. In embodiments, a device may initiate entry into a low power mode (LPM), also referred to as a low power state, in which only a minimal supply voltage (e.g., an AON voltage) is provided to the device to reduce power consumption.

Supply voltage policy exchanges may also be used to enable slave devices (and/or a master device) to enter into and exit from low power modes. To this end, when a given slave device such as a given sensor is to enter a low power mode, a low power state indication may be sent to the PMIC, to cause the PMIC to update the supply voltage provided to the slave device to, e.g., a given low power supply voltage. In an embodiment this updated supply voltage may be an always on voltage, which may be sufficient to maintain a minimal amount of circuitry (namely an AON domain of the device) to enable identification of an appropriate exit point from the low power mode. Via a supply voltage policy exchange, the PMIC may communicate indication of this low power state to the master device. In turn, the master device itself may enter into a given low power state, should all devices coupled to the bus be in some type of low power mode.

Thereafter during a sensing activity, a given slave device may assert a wakeup to the PMIC to cause the PMIC to provide a given operating voltage to this slave device. Thereafter, the PMIC may enable supply voltage for both the master device and the given slave device. Address assignments and supply voltage configurations then may occur to enable exit from the low power state.

Figure 7:
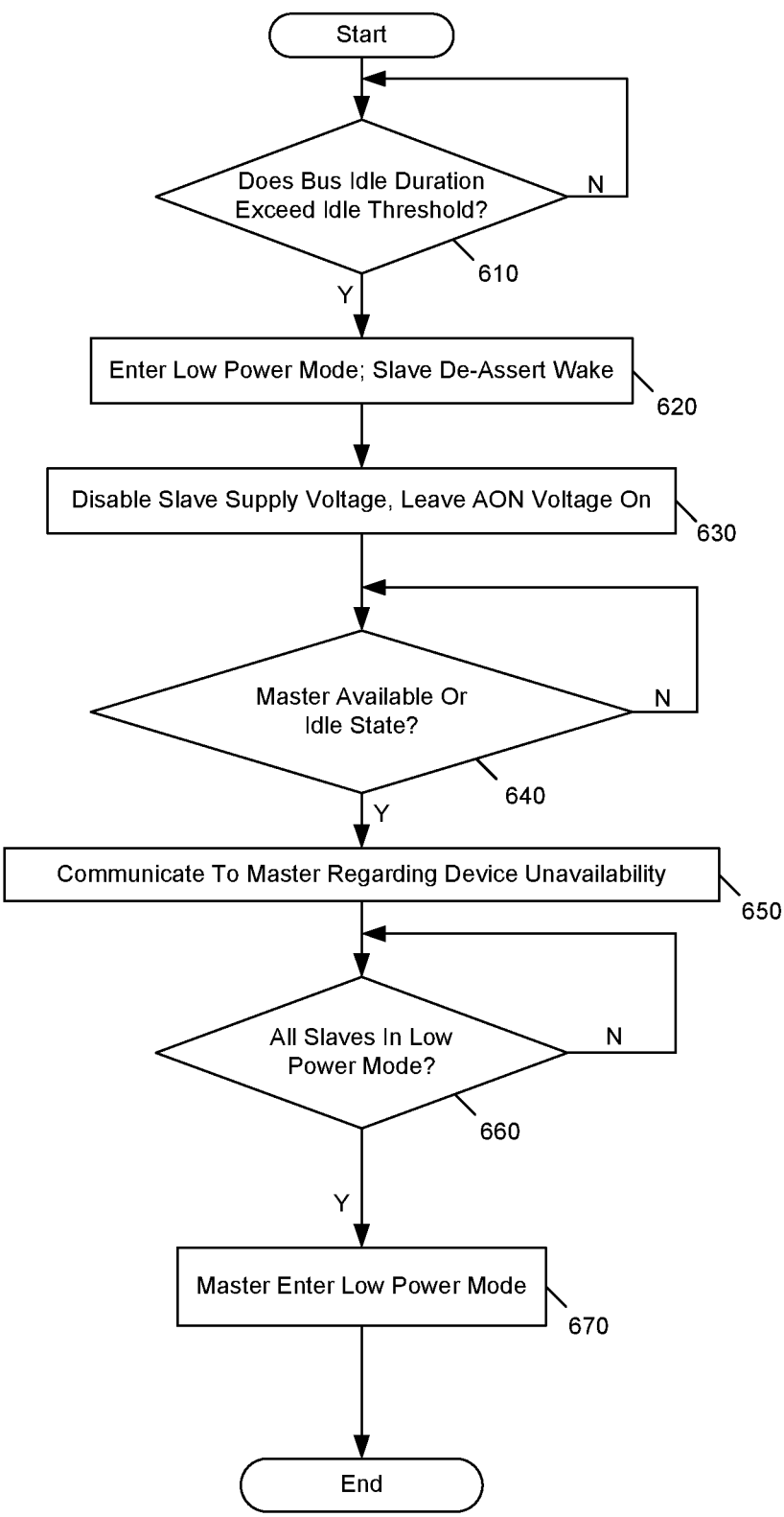
FIG. 7 is a flow diagram of a method in accordance with another embodiment of the present invention.

Bus communications may occur during a LPM entry flow. Referring now to FIG. 7, shown is a flow diagram of a method in accordance with another embodiment of the present invention. More specifically, method 600 of FIG. 7 is a method for performing an LPM entry flow for a given device. Method 600 may be performed by controllers of various devices including a slave device, a master device and a PMIC. In an embodiment, method 600 begins by determining whether a bus is idle for at least an idle duration that exceeds an idle threshold (diamond 610). This idle threshold may be stored in a configuration register of the device, and a counter of the device may be maintained that performs counting activity while no bus activity occurs. Thus if the bus is idle for a counter duration that exceeds this idle threshold, the determination at diamond 610 is in the affirmative and accordingly control passes to block 620 where the slave device may enter into an LPM. To this end, a slave may deassert a wake signal (which in an embodiment may occur by resetting a wake signal that is communicated from the slave device to the PMIC). In an embodiment, an AON domain of the slave device may communicate this wake signal.

Control next passes to block 630 where, in response to receipt of this deasserted wake signal, the PMIC may disable a supply voltage provided to the slave device. Note however that the PMIC may enable an AON supply voltage to be maintained, such that the slave device may maintain an AON domain of the device powered on to initiate an exit from the LPM state at an appropriate time. Control next passes to diamond 640 to determine whether the master is available or an idle state is occurring. If this is the case, control passes to block 650 where the PMIC communicates to the master to inform the master of the unavailability of the device that has now entered into the LPM state. Still with reference to FIG. 7, control passes to diamond 660 to determine whether all slaves are in the LPM state. If this situation occurs, meaning that no slave devices coupled to the multi-drop bus are active, control passes to block 670 where the master itself may enter into the LPM state. To this end, the PMIC may send a LPM command to the master device to request that the master device enter into the LPM state. Understand while shown at this high level in the embodiment of FIG. 7, many variations and alternatives are possible.

Figure 8:
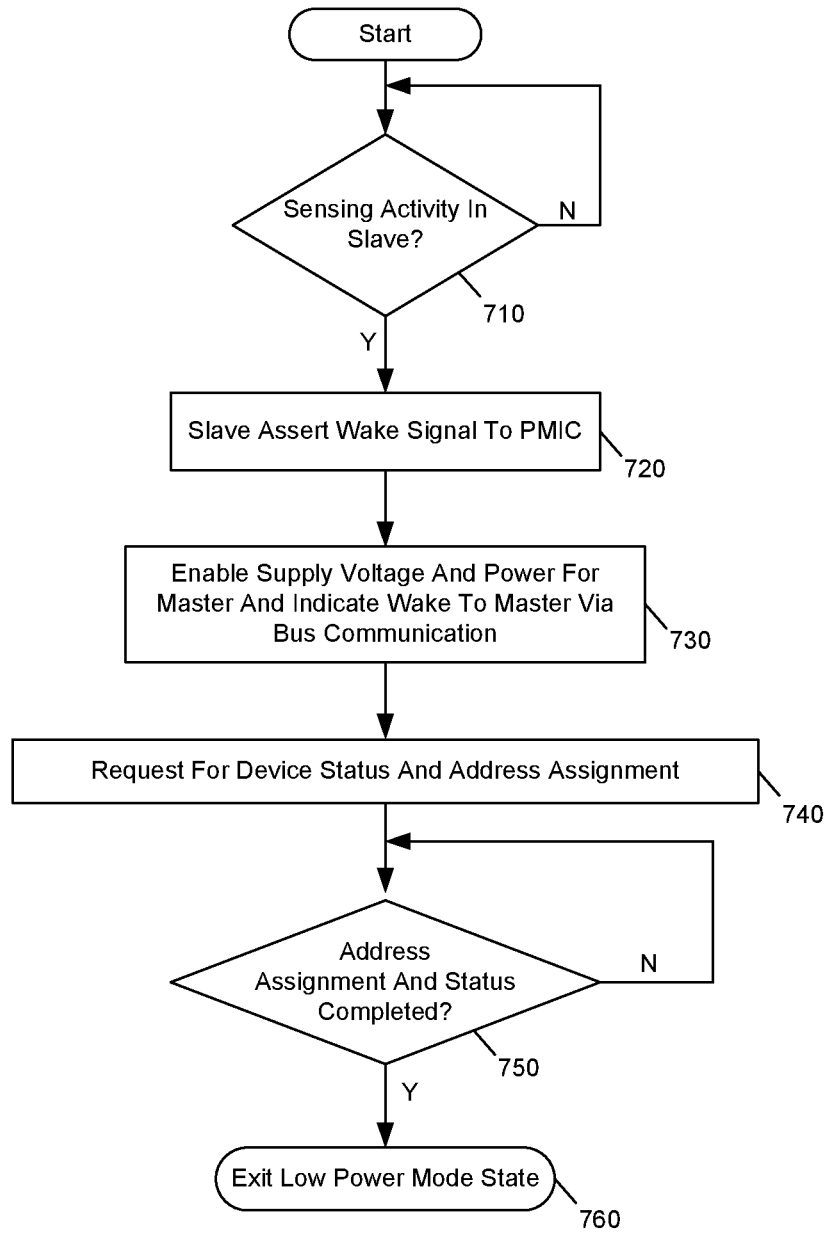
FIG. 8 is a flow diagram of a method in accordance with yet another embodiment of the present invention.

Note that while a slave device is in an LPM state and sensing activity is detected (e.g., via the AON domain of the slave device), the slave device may assert the wake signal to the PMIC. In response to this wake signal, the PMIC may enable appropriate supply voltages for the slave (and the master, if the master also was in an LPM state). When the master determines that the slave device is available (as based on device status information), a dynamic address assignment process may be performed to enable the slave device to exit the LPM state. Referring now to FIG. 8, shown is a flow diagram of a method in accordance with yet another embodiment of the present invention. More specifically, method 700 of FIG. 8 is a method for exiting a LPM state in accordance with an embodiment. Method 700 may be performed by controllers of various devices including a slave device, a master device and a PMIC. As seen, method 700 begins by determining whether sensing activity is identified in a slave device (diamond 710). If so, control passes to block 720 where the slave asserts the wake signal to the PMIC. For example, an active value of this wake signal can be sent from the AON domain of the slave device to the PMIC.

Still with reference to FIG. 8, control passes to block 730 where the PMIC enables one or more supply voltages and provides power for the slave (and the master if the master was in a low power state). Thereafter the PMIC sends a wake indication to the master device, indicating that the given slave device is in a wake process. Accordingly, control next passes to block 740 where the master sends a request for device status and address assignment. This request is used to check whether the device is still present before starting assignment of a dynamic address, or to check whether any new devices have joined the bus. In embodiments, such communication may occur at a default voltage configuration. Next it is determined whether the address assignment and status is completed (diamond 750). Upon such determination, the LPM state may be exited (block 760) and, e.g., a dynamic power supply policy exchange communication may occur to enable the master and slave to communicate at a given supply voltage (e.g., a voltage different than the default supply voltage). Understand while shown at this high level in the embodiment of FIG. 8, many variations and alternatives are possible.

Using embodiments as described herein, a given system can be implemented with a reduced number of pins and wires to interconnect devices, realizing a reduced bill of materials and reduced chip and circuit board real estate cost. Still further, flexibility is provided to enable a given designer to select appropriate devices (operating at different supply voltages) to be incorporated into a single system and couple to a single multi-drop bus. Still further, such design of a system may be realized with simplified board area and routing.

Figure 9:
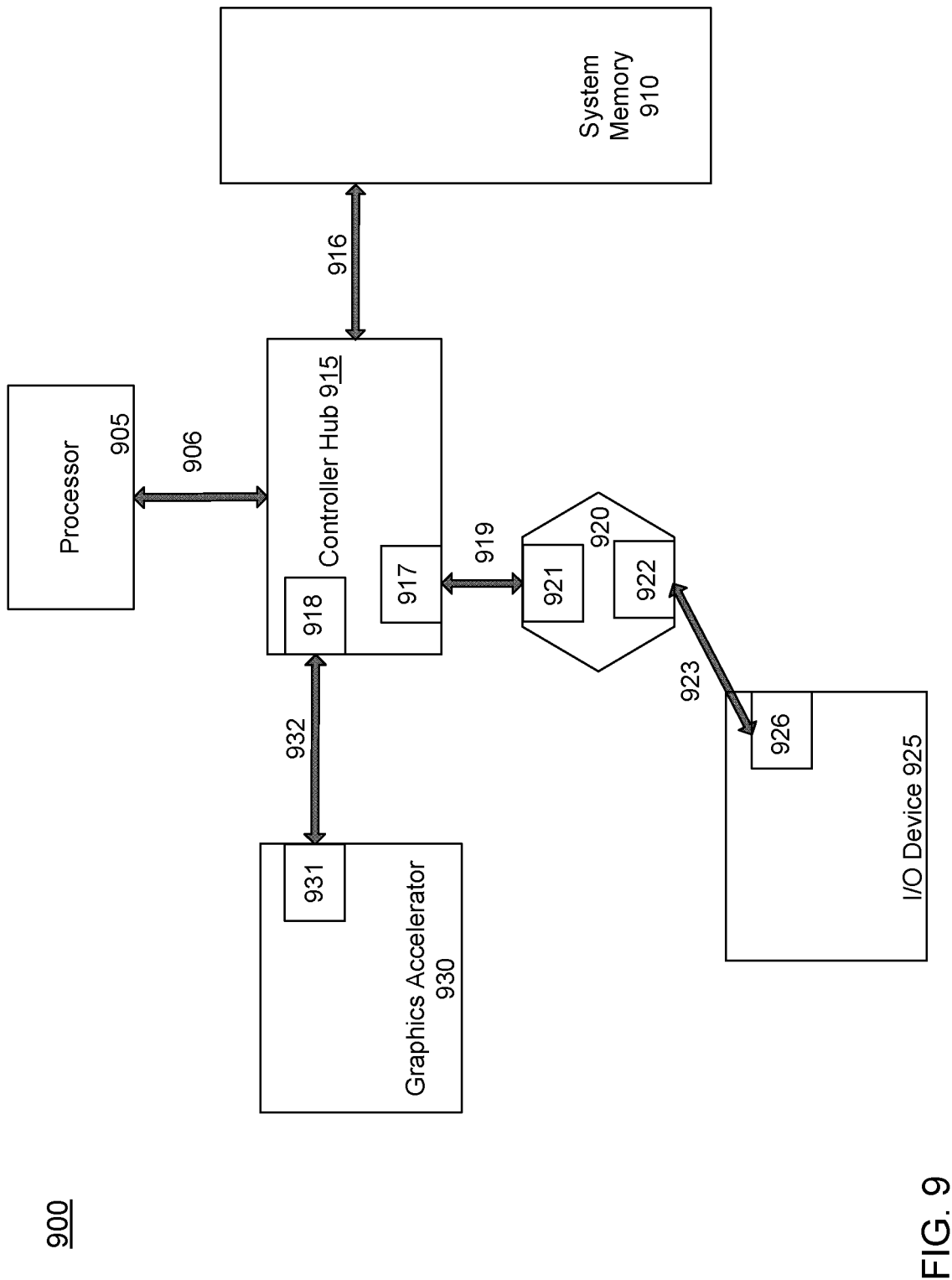
FIG. 9 is an embodiment of a fabric composed of point-to-point links that interconnect a set of components.

Embodiments may be implemented in a wide variety of interconnect structures. Referring to FIG. 9, an embodiment of a fabric composed of point-to-point links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect. In another embodiment, link 906 includes a parallel serial, differential interconnect architecture that is compliant with different interconnect standards, and which may couple with one or more host controllers that enable supply voltage policy exchanges and dynamic supply voltage operation by various link partners as described herein.

System memory 910 includes any memory device, such as random access memory (RAM), non-volatile (NV) memory, or other memory accessible by devices in system 900. System memory 910 is coupled to controller hub 915 through a memory link 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a PCIe interconnection hierarchy. Examples of controller hub 915 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through controller hub 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e., up a hierarchy towards a root complex, to controller hub 915 and downstream, i.e., down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a hard drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example, and which may enable multiple link partners to operate at dynamic supply voltage configurations as described herein. Often in the PCIe vernacular, such a device is referred to as an endpoint. Although not specifically shown, device 925 may include a PCIe to PCI/PCI-X bridge to support legacy or other version PCI devices. Endpoint devices in PCIe are often classified as legacy, PCIe, or root complex integrated endpoints.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. A graphics controller or the graphics accelerator 930 itself may be integrated in processor 905.

Figure 10:
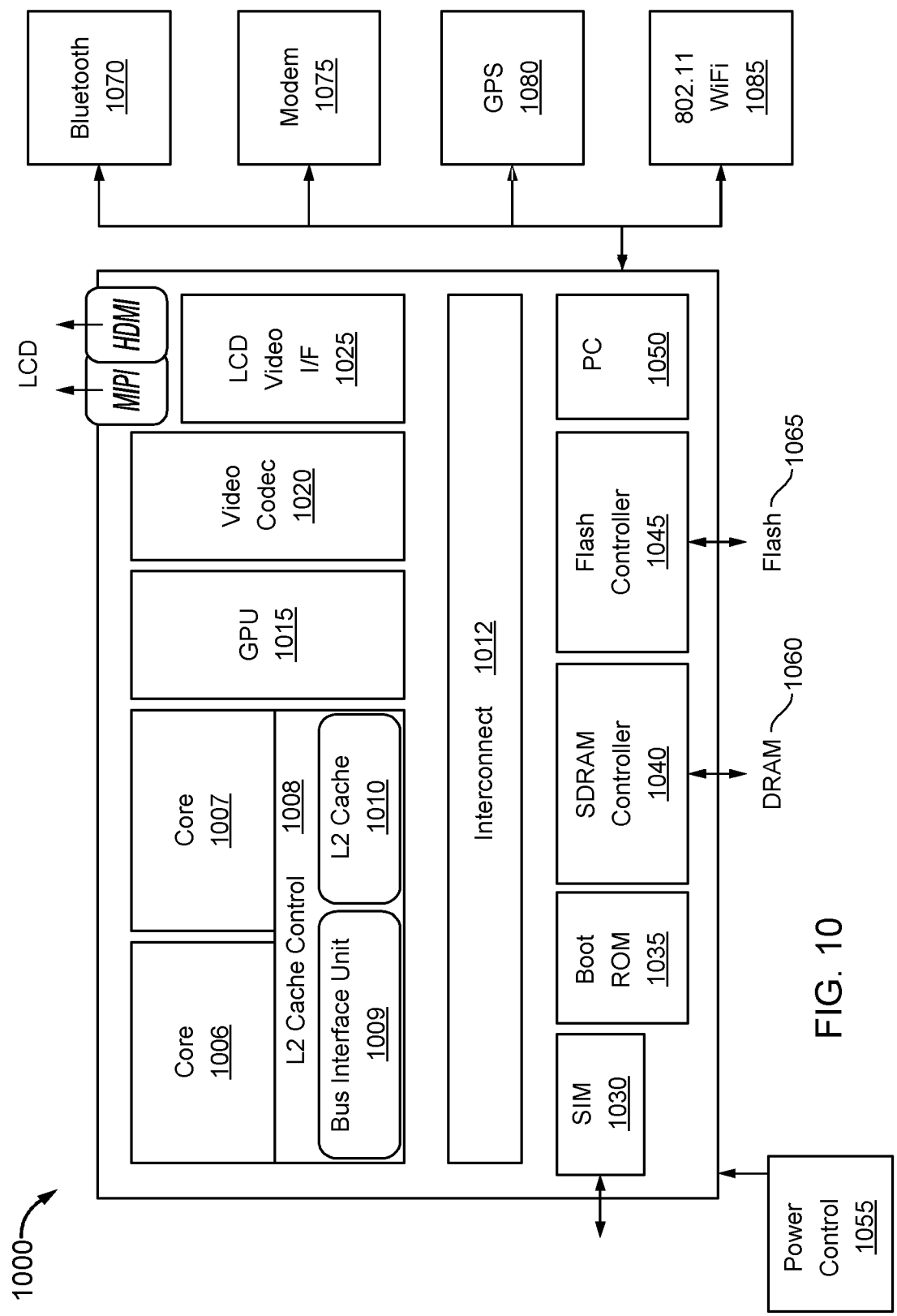
FIG. 10 is an embodiment of a system-on-chip design in accordance with an embodiment.

Turning next to FIG. 10, an embodiment of a SoC design in accordance with an embodiment is depicted. As a specific illustrative example, SoC 1000 may be configured for insertion in any type of computing device, ranging from portable device to server system. Here, SoC 1000 includes 2 cores 1006 and 1007. Cores 1006 and 1007 may conform to an instruction set architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000 via an interconnect 1012.

Interconnect 1012 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g., DRAM 1060), a flash controller 1045 to interface with non-volatile memory (e.g., flash 1065), a peripheral controller 1050 (e.g., an eSPI interface) to interface with peripherals, video codecs 1020 and video interface 1025 to display and receive input (e.g., touch enabled input), GPU 1015 to perform graphics related computations, etc. Any of these interconnects/interfaces may incorporate aspects described herein, including the ability to perform supply voltage policy exchanges and operate at different IO voltages as described herein. In addition, the system illustrates peripherals for communication, such as a Bluetooth module 1070, modem 1075, GPS 1080, and WiFi 1085. Also included in the system is a power controller 1055.

Figure 11:
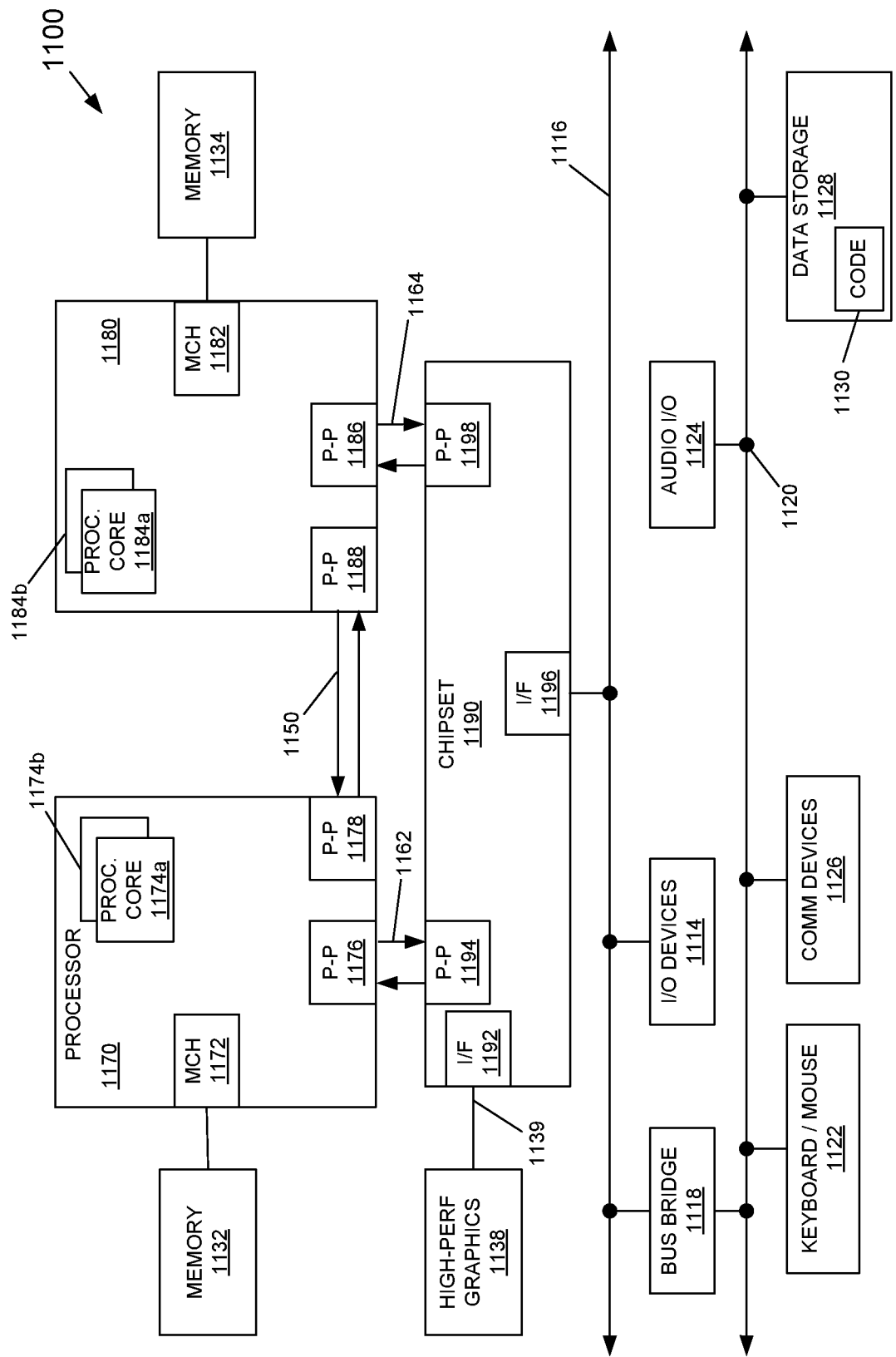
FIG. 11 is a block diagram of a system in accordance with an embodiment of the present invention.

Referring now to FIG. 11, shown is a block diagram of a system in accordance with an embodiment of the present invention. As shown in FIG. 11, multiprocessor system 1100 includes a first processor 1170 and a second processor 1180 coupled via a point-to-point interconnect 1150. As shown in FIG. 11, each of processors 1170 and 1180 may be many core processors including representative first and second processor cores (i.e., processor cores 1174a and 1174b and processor cores 1184a and 1184b).

Still referring to FIG. 11, first processor 1170 further includes a memory controller hub (MCH) 1172 and point-to-point (P-P) interfaces 1176 and 1178. Similarly, second processor 1180 includes a MCH 1182 and P-P interfaces 1186 and 1188. As shown in FIG. 11, MCH's 1172 and 1182 couple the processors to respective memories, namely a memory 1132 and a memory 1134, which may be portions of system memory (e.g., DRAM) locally attached to the respective processors. First processor 1170 and second processor 1180 may be coupled to a chipset 1190 via P-P interconnects 1162 and 1164, respectively. As shown in FIG. 11, chipset 1190 includes P-P interfaces 1194 and 1198.

Furthermore, chipset 1190 includes an interface 1192 to couple chipset 1190 with a high performance graphics engine 1138, by a P-P interconnect 1139. As shown in FIG. 11, various input/output (I/O) devices 1114 may be coupled to first bus 1116, along with a bus bridge 1118 which couples first bus 1116 to a second bus 1120. Various devices may be coupled to second bus 1120 including, for example, a keyboard/mouse 1122, communication devices 1126 and a data storage unit 1128 such as a disk drive or other mass storage device which may include code 1130, in one embodiment. Further, an audio I/O 1124 may be coupled to second bus 1120. Any of the devices shown in FIG. 11 may be configured to operate with controllable 10 voltages, in response to a supply voltage policy exchange via one or more of the interconnect structures, as described herein.

The following examples pertain to further embodiments.

In one example, an apparatus comprises: an I/O circuit to communicate information at a selected voltage via an interconnect to which a plurality of devices may be coupled; and a host controller to couple to the interconnect. The host controller may include a supply voltage policy control circuit to initiate a supply voltage policy exchange with a first device of the plurality of devices to obtain a first supply voltage capability of the first device and to cause the I/O circuit and the first device to be configured to communicate via the interconnect at a first supply voltage based on the first supply voltage capability, the first supply voltage different than a default supply voltage for the interconnect.

In an example, the supply voltage policy control circuit is to perform the supply voltage policy exchange at the default supply voltage.

In an example, the supply voltage policy control circuit is to store a value of the first supply voltage in a configuration storage associated with the first device.

In an example, in response to a second supply voltage policy exchange with a second device of the plurality of devices, the I/O circuit is to communicate with the second device at a second supply voltage, the second supply voltage different than the first supply voltage and the default voltage.

In an example, the apparatus further comprises a PMIC to provide the first supply voltage to the first device in response to a first voltage request from the host controller.

In an example, the PMIC is to send a voltage status message to the host controller in response to provision of the first supply voltage to the first device, the host controller to begin a communication with the first device at the first supply voltage in response to receipt of the voltage status message.

In an example, the PMIC is coupled to the host controller via the interconnect.

In an example, the host controller is to receive a low power state message from the PMIC to indicate that the first device is in a low power state.

In an example, based at least in part on the low power state message, the host controller is to enter a low power state.

In an example, in response to a low power state exit message from the PMIC, the host controller is to access a configuration storage to identify the value of the first supply voltage and thereafter to communicate with the first device via the interconnect at the first supply voltage.

In another example, a method comprises: performing, by a host controller coupled to a bus having a plurality of devices coupled thereto, a supply voltage policy exchange with the plurality of devices to identify a supply voltage capability for the plurality of devices, at least some of the devices to communicate via the bus at different voltages; identifying a first supply voltage capability for a first device of the plurality of devices; and communicating with the first device via the bus at a first voltage according to the first supply voltage capability.

In an example, the method further includes configuring an I/O circuit of a processor including the host controller to operate at the first voltage.

In an example, the method further comprises: identifying a second supply voltage capability for a second device of the plurality of devices; and communicating with the second device via the bus at a second voltage according to the second supply voltage capability.

In an example, the method further comprises, in response to the supply voltage policy exchange, storing the first supply voltage capability in a configuration storage of the host controller, and where identifying the first supply voltage capability comprises accessing the configuration storage in response to a request to communicate with the first device.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes a processor having: at least one processing circuit to execute instructions; a host controller to control communication on an interconnect to which a plurality of devices are coupled; and an I/O circuit to communicate information via the interconnect, where the host controller is to dynamically configure the I/O circuit to operate at a first supply voltage of a plurality of supply voltages to communicate first information to a first device of the plurality of devices at the first supply voltage based on first supply voltage configuration information associated with the first device, and thereafter dynamically configure the I/O circuit to operate at a second supply voltage of the plurality of supply voltages to communicate second information to a second device of the plurality of devices at the second supply voltage based on second supply voltage configuration information associated with the second device. The system may further include the first device coupled to the processor via the interconnect and the second device coupled to the processor via the interconnect.

In an example, the host controller comprises a voltage policy control circuit to initiate a voltage policy exchange with the first device to obtain the first supply voltage configuration information, where the voltage policy exchange is to occur at a default supply voltage of the interconnect.

In an example, the host controller is to send a broadcast command to the plurality of devices to inform the plurality of devices regarding a change to a supply voltage of the interconnect to the first supply voltage, and in response to the broadcast command, at least the first device is to configure a first I/O circuit of the first device to operate at the first supply voltage.

In an example, the system further comprises a PMIC coupled to the processor via the interconnect, where the PMIC is to provide the first supply voltage to the first device in response to a first voltage request from the host controller.

In an example, the PMIC is to receive a low power state indication from the first device to indicate that the first device is to enter into a low power state, and in response to the low power state indication send a low power state message to the host controller to indicate that the first device is in the low power state.

In an example, the host controller comprises a configuration storage to store the first supply voltage configuration information and the second supply voltage configuration information, where after the first device exits the low power state, the host controller is to communicate with the first device via the interconnect at the first supply voltage, based at least in part on the first supply voltage configuration information stored in the configuration storage.

In yet another example, an apparatus comprises: an I/O means for communicating information at a selected voltage via an interconnect means to which a plurality of devices may be coupled; and a host control means for coupling to the interconnect means. The host control means may initiate a supply voltage policy exchange with a first device of the plurality of devices to obtain a first supply voltage capability of the first device and cause the I/O means and the first device to be configured to communicate via the interconnect means at a first supply voltage based on the first supply voltage capability, the first supply voltage different than a default supply voltage for the interconnect means.

In an example, the host control means is to perform the supply voltage policy exchange at the default supply voltage.

In an example, the host control means is to store a value of the first supply voltage in a configuration storage means associated with the first device.

In an example, in response to a second supply voltage policy exchange with a second device of the plurality of devices, the I/O means is to communicate with the second device at a second supply voltage, the second supply voltage different than the first supply voltage and the default voltage.

In an example, the apparatus further comprises power management control means for providing the first supply voltage to the first device in response to a first voltage request from the host control means.

In an example, the power management control means is to send a voltage status message to the host control means in response to provision of the first supply voltage to the first device, the host control means to begin a communication with the first device at the first supply voltage in response to receipt of the voltage status message.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    an input/output (I/O) circuit to communicate information at a selected voltage via an interconnect to which a plurality of devices may be coupled; and
    a host controller including a supply voltage policy control circuit to couple to the I/O circuit, the host controller to:
        initiate a supply voltage policy exchange with a first device of the plurality of devices to obtain a first supply voltage capability of the first device via the I/O circuit, the supply voltage policy exchange to occur between the I/O circuit and the first device via the interconnect;
        cause the I/O circuit and the first device to be configured to communicate via the interconnect at a first supply voltage based on the first supply voltage capability, the first supply voltage different than a default supply voltage for the interconnect; and
        cause the I/O circuit to communicate via the interconnect with a power management integrated circuit (PMIC) to provide the first supply voltage to the first device in response to a first voltage request from the host controller.

2. The apparatus of claim 1, wherein the supply voltage policy control circuit is to perform the supply voltage policy exchange at the default supply voltage.

3. The apparatus of claim 1, wherein the supply voltage policy control circuit is to store a value of the first supply voltage in a configuration storage associated with the first device.

4. The apparatus of claim 1, wherein, in response to a second supply voltage policy exchange with a second device of the plurality of devices, the I/O circuit is to communicate with the second device at a second supply voltage, the second supply voltage different than the first supply voltage and the default voltage.

5. The apparatus of claim 1, wherein the PMIC is to send a voltage status message to the host controller in response to provision of the first supply voltage to the first device, the host controller to begin a communication with the first device at the first supply voltage in response to receipt of the voltage status message.

6. The apparatus of claim 1, wherein the host controller is to receive a low power state message from the PMIC to indicate that the first device is in a low power state.

7. The apparatus of claim 6, wherein based at least in part on the low power state message, the host controller is to enter a low power state.

8. The apparatus of claim 7, wherein in response to a low power state exit message from the PMIC, the host controller is to access a configuration storage to identify the value of the first supply voltage and thereafter to communicate with the first device via the interconnect at the first supply voltage.

9. A machine-readable medium having stored thereon instructions, which if performed by a machine cause the machine to perform a method comprising:
    performing, by a host controller coupled to a bus having a plurality of devices coupled thereto, a supply voltage policy exchange with the plurality of devices to identify a supply voltage capability for the plurality of devices, at least some of the devices to communicate via the bus at different voltages, the host controller coupled to the bus via an input/output (I/O) circuit, wherein the supply voltage policy exchange is to occur between the I/O circuit and a first device of the plurality of devices via the bus;
    identifying a first supply voltage capability for the first device of the plurality of devices;
    communicating with the first device via the bus at a first voltage according to the first supply voltage capability; and
    communicating with a power management integrated circuit (PMIC) via the bus to provide the first supply voltage to the first device in response to a first voltage request from the host controller, the communication to occur between the I/O circuit and the PMIC via the bus.

10. The machine-readable medium of claim 9, wherein the method further comprises configuring the I/O circuit of a processor including the host controller to operate at the first voltage.

11. The machine-readable medium of claim 9, wherein the method further comprises:
    identifying a second supply voltage capability for a second device of the plurality of devices; and
    communicating with the second device via the bus at a second voltage according to the second supply voltage capability.

12. The machine-readable medium of claim 9, wherein the method further comprises, in response to the supply voltage policy exchange, storing the first supply voltage capability in a configuration storage of the host controller, and wherein identifying the first supply voltage capability comprises accessing the configuration storage in response to a request to communicate with the first device.

13. A system comprising:
a processor having:
at least one processing circuit to execute instructions;
a host controller to control communication on an interconnect to which a plurality of devices are coupled; and
an input/output (I/O) circuit to communicate information via the interconnect, wherein the host controller is to dynamically configure the I/O circuit to operate at a first supply voltage of a plurality of supply voltages to communicate first information to a first device of the plurality of devices at the first supply voltage based on first supply voltage configuration information associated with the first device via the interconnect, and thereafter dynamically configure the I/O circuit to operate at a second supply voltage of the plurality of supply voltages to communicate second information to a second device of the plurality of devices at the second supply voltage based on second supply voltage configuration information associated with the second device via the interconnect;
a power management integrated circuit (PMIC) coupled to the I/O circuit of the processor via the interconnect, wherein the PMIC is to provide the first supply voltage to the first device in response to a first voltage request generated by the host controller and received from the I/O circuit via the interconnect; and
the first device coupled to the processor via the interconnect;
the second device coupled to the processor via the interconnect.

14. The system of claim 13, wherein the host controller comprises a voltage policy control circuit to initiate a voltage policy exchange with the first device to obtain the first supply voltage configuration information, wherein the voltage policy exchange is to occur between the I/O circuit and the first device at a default supply voltage of the interconnect.

15. The system of claim 13, wherein the host controller is to send a broadcast command to the plurality of devices to inform the plurality of devices regarding a change to a supply voltage of the interconnect to the first supply voltage, and in response to the broadcast command, at least the first device is to configure a first I/O circuit of the first device to operate at the first supply voltage.

16. The system of claim 13, wherein the PMIC is to receive a low power state indication from the first device to indicate that the first device is to enter into a low power state, and in response to the low power state indication send a low power state message to the host controller to indicate that the first device is in the low power state.

17. The system of claim 16, wherein the host controller comprises a configuration storage to store the first supply voltage configuration information and the second supply voltage configuration information, wherein after the first device exits the low power state, the host controller is to communicate with the first device via the interconnect at the first supply voltage, based at least in part on the first supply voltage configuration information stored in the configuration storage.

18. The apparatus of claim 1, wherein the PMIC is to provide supply voltages to the apparatus and to each of the plurality of devices.

19. The system of claim 13, wherein the PMIC is to supply voltages to the processor and to each of the plurality of devices.

20. The system of claim 13, wherein the host controller comprises a supply voltage policy control circuit and the supply voltage policy control circuit is to implement the supply voltage policy exchange at the default supply voltage.

* * * * *